United States Patent
Ekici et al.

(10) Patent No.: US 9,967,055 B2
(45) Date of Patent: May 8, 2018

(54) SYSTEM AND METHOD TO INCREASE LINK ADAPTATION PERFORMANCE WITH MULTI-LEVEL FEEDBACK

(71) Applicant: BlackBerry Limited, Waterloo (CA)

(72) Inventors: Ozgur Ekici, Escondido, CA (US); Muhammad Khaledul Islam, Ottawa (CA)

(73) Assignee: BlackBerry Limited, Waterloo (CA)

( * ) Notice: Subject to any disclaimer, the term of this patent is extended or adjusted under 35 U.S.C. 154(b) by 35 days.

(21) Appl. No.: 14/979,804

(22) Filed: Dec. 28, 2015

(65) Prior Publication Data

US 2016/0191198 A1 Jun. 30, 2016

Related U.S. Application Data

(63) Continuation of application No. 13/204,753, filed on Aug. 8, 2011, now abandoned.

(51) Int. Cl.
*H04L 1/00* (2006.01)
*H04L 1/18* (2006.01)

(52) U.S. Cl.
CPC .......... *H04L 1/0003* (2013.01); *H04L 1/0007* (2013.01); *H04L 1/1854* (2013.01)

(58) Field of Classification Search
CPC .... H04L 1/0003; H04L 1/0007; H04L 1/1854
See application file for complete search history.

(56) References Cited

U.S. PATENT DOCUMENTS

| | | | |
|---|---|---|---|
| 4,945,556 A | 7/1990 | Namekawa | |
| 5,864,765 A | 1/1999 | Barvesten | |
| 5,987,440 A | 11/1999 | O'Neil et al. | |
| 5,987,611 A | 11/1999 | Freund | |
| 6,052,735 A | 4/2000 | Ulrich et al. | |
| 6,105,132 A | 8/2000 | Fritch et al. | |
| 6,233,446 B1 | 5/2001 | Do | |
| 6,292,798 B1 | 9/2001 | Dockter et al. | |
| 6,351,816 B1 | 2/2002 | Mueller et al. | |
| 6,360,322 B1 | 3/2002 | Grawrock | |
| 6,405,202 B1 | 6/2002 | Britton et al. | |
| 6,412,070 B1 | 6/2002 | Van Dyke et al. | |

(Continued)

FOREIGN PATENT DOCUMENTS

| | | |
|---|---|---|
| CN | 101523878 A | 9/2009 |
| EP | 0973350 A2 | 1/2000 |

(Continued)

OTHER PUBLICATIONS

Canadian Intellectual Property Office, Office Action for Application No. 2,783,453, dated Feb. 27, 2017.

(Continued)

*Primary Examiner* — Walter Divito

(74) *Attorney, Agent, or Firm* — Moffat & Co.

(57) ABSTRACT

A method and apparatus for explicit adaptive modulation and coding scheme selection, the method receiving, at a mobile device, a transport block targeted to the mobile device, and if a quality of the received transport block exceeds a threshold, providing an acknowledgment or negative acknowledgment to a network element; and if the quality of the received transport block is below the threshold, suppressing the acknowledgment or negative acknowledgement.

12 Claims, 4 Drawing Sheets

(56) References Cited

U.S. PATENT DOCUMENTS

| | | |
|---|---|---|
| 6,516,421 B1 | 2/2003 | Peters |
| 6,647,388 B2 | 11/2003 | Numao et al. |
| 6,668,323 B1 | 12/2003 | Challener et al. |
| 6,757,821 B1 | 6/2004 | Akiyama et al. |
| 6,772,350 B1 | 8/2004 | Belani et al. |
| 6,795,967 B1 | 9/2004 | Evans et al. |
| 6,886,038 B1 | 4/2005 | Tabbara et al. |
| 6,957,330 B1 | 10/2005 | Hughes |
| 6,978,385 B1 | 12/2005 | Cheston |
| 7,047,473 B2 | 5/2006 | Hwang et al. |
| 7,096,401 B2 | 8/2006 | Cudak et al. |
| 7,120,134 B2 | 10/2006 | Tiedemann, Jr. et al. |
| 7,126,928 B2 | 10/2006 | Tiedemann, Jr. et al. |
| 7,149,192 B2 | 12/2006 | Kwak |
| 7,246,374 B1 | 7/2007 | Simon et al. |
| 7,331,058 B1 | 2/2008 | Gladney |
| 7,373,657 B2 | 5/2008 | Walker |
| 7,400,674 B2 | 7/2008 | Gu |
| 7,400,878 B2 | 7/2008 | Hassan et al. |
| 7,471,693 B2 | 12/2008 | Petrovic et al. |
| 7,519,018 B2 | 4/2009 | Kwak |
| 7,555,723 B1 | 6/2009 | Coe |
| 7,574,200 B2 | 8/2009 | Hassan et al. |
| 7,583,614 B2 | 9/2009 | Golitschek et al. |
| 7,649,839 B2 | 1/2010 | Dendy |
| 7,672,265 B2 | 3/2010 | Kwak |
| 7,694,328 B2 | 4/2010 | Joshi et al. |
| 7,760,698 B2 | 7/2010 | Chen et al. |
| 7,783,949 B2 | 8/2010 | Lohr et al. |
| 7,813,322 B2 | 10/2010 | Laroia et al. |
| 7,818,647 B2 | 10/2010 | Lohr et al. |
| 7,869,789 B2 | 1/2011 | Hassan et al. |
| 7,917,963 B2 | 3/2011 | Goyal et al. |
| 8,001,375 B2 | 8/2011 | Hattori et al. |
| 8,005,507 B2 | 8/2011 | Celik |
| 8,074,078 B2 | 12/2011 | Brown et al. |
| 8,095,124 B2 | 1/2012 | Balia |
| 8,204,480 B1 | 6/2012 | Lindteigen et al. |
| 8,205,257 B1 | 6/2012 | Satish et al. |
| 8,244,279 B2 | 8/2012 | Dicke et al. |
| 8,275,356 B2 | 9/2012 | Hickie |
| 8,370,929 B1 | 2/2013 | Pennington et al. |
| 2001/0047485 A1 | 11/2001 | Brown et al. |
| 2002/0013815 A1 | 1/2002 | Obradovich et al. |
| 2002/0019944 A1 | 2/2002 | Kou |
| 2002/0031230 A1 | 3/2002 | Sweet et al. |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2003/0005317 A1 | 1/2003 | Audebert et al. |
| 2003/0053435 A1 | 3/2003 | Sindhushayana et al. |
| 2003/0061482 A1 | 3/2003 | Emmerichs |
| 2003/0065676 A1 | 4/2003 | Gbadegesin et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0163685 A1 | 8/2003 | Paatero |
| 2003/0177389 A1 | 9/2003 | Albert et al. |
| 2003/0188252 A1 | 10/2003 | Kim et al. |
| 2004/0001101 A1 | 1/2004 | Trajkovic et al. |
| 2004/0111360 A1 | 6/2004 | Albanese |
| 2005/0091309 A1 | 4/2005 | Bookman et al. |
| 2005/0154935 A1 | 7/2005 | Jin |
| 2005/0210270 A1 | 9/2005 | Rohatgi et al. |
| 2005/0213763 A1 | 9/2005 | Owen et al. |
| 2005/0223239 A1 | 10/2005 | Dotan |
| 2006/0059556 A1 | 3/2006 | Royer |
| 2006/0070114 A1 | 3/2006 | Wood et al. |
| 2006/0129948 A1 | 6/2006 | Hamzy et al. |
| 2006/0156026 A1 | 7/2006 | Utin |
| 2006/0212589 A1 | 9/2006 | Hayer et al. |
| 2006/0212925 A1 | 9/2006 | Shull et al. |
| 2006/0212945 A1 | 9/2006 | Donlin et al. |
| 2006/0236126 A1 | 10/2006 | Adams et al. |
| 2006/0253894 A1 | 11/2006 | Bookman et al. |
| 2006/0294102 A1 | 12/2006 | Reddish et al. |
| 2007/0073694 A1 | 3/2007 | Picault et al. |
| 2007/0110095 A1 | 5/2007 | Attar et al. |
| 2007/0186275 A1 | 8/2007 | Shahbazi |
| 2007/0226778 A1 | 9/2007 | Pietruszka |
| 2007/0277127 A1 | 11/2007 | Carlson et al. |
| 2008/0049692 A1 | 2/2008 | Bachu et al. |
| 2008/0081609 A1 | 4/2008 | Burgan et al. |
| 2008/0084844 A1 | 4/2008 | Reznik et al. |
| 2008/0101312 A1 | 5/2008 | Suzuki et al. |
| 2008/0104572 A1 | 5/2008 | Hernandez et al. |
| 2008/0222711 A1 | 9/2008 | Michaelis |
| 2008/0254767 A1 | 10/2008 | Jin |
| 2008/0282093 A1 | 11/2008 | Hatakeyama |
| 2009/0024992 A1 | 1/2009 | Kulaga et al. |
| 2009/0049510 A1 | 2/2009 | Zhang et al. |
| 2009/0049518 A1 | 2/2009 | Roman et al. |
| 2009/0129276 A1 | 5/2009 | Dendy |
| 2009/0254753 A1 | 10/2009 | De Atley et al. |
| 2009/0271583 A1 | 10/2009 | Kershaw et al. |
| 2009/0275324 A1* | 11/2009 | Marco .................. H04L 1/0003 455/422.1 |
| 2009/0300453 A1 | 12/2009 | Sahara |
| 2010/0031110 A1 | 2/2010 | Seok et al. |
| 2010/0031325 A1 | 2/2010 | Maigne et al. |
| 2010/0050244 A1 | 2/2010 | Tarkhanyan et al. |
| 2010/0057911 A1 | 3/2010 | Soppet et al. |
| 2010/0093379 A1 | 4/2010 | Neely et al. |
| 2010/0175104 A1 | 7/2010 | Khalid |
| 2010/0241610 A1 | 9/2010 | Gibson et al. |
| 2010/0299376 A1 | 11/2010 | Batchu et al. |
| 2010/0306528 A1 | 12/2010 | Andress et al. |
| 2010/0319053 A1 | 12/2010 | Gharabally |
| 2011/0055917 A1 | 3/2011 | Wickstrom |
| 2011/0099643 A1 | 4/2011 | Harvey et al. |
| 2011/0107437 A1 | 5/2011 | Goyal et al. |
| 2011/0145833 A1 | 6/2011 | De Los Reyes et al. |
| 2011/0167470 A1 | 7/2011 | Walker et al. |
| 2011/0246566 A1 | 10/2011 | Kashef et al. |
| 2011/0276806 A1 | 11/2011 | Casper et al. |
| 2011/0277038 A1 | 11/2011 | Sahita et al. |
| 2011/0314467 A1 | 12/2011 | Pearson |
| 2012/0014321 A1 | 1/2012 | Schmitz |
| 2012/0023573 A1 | 1/2012 | Shi |
| 2012/0054853 A1 | 3/2012 | Gupta et al. |
| 2012/0079609 A1 | 3/2012 | Bender et al. |
| 2012/0124640 A1 | 5/2012 | Bender |
| 2012/0131685 A1 | 5/2012 | Broch et al. |
| 2012/0144196 A1 | 6/2012 | Owen |
| 2012/0202527 A1 | 8/2012 | Obradovich et al. |
| 2012/0311282 A1 | 12/2012 | Cannon et al. |
| 2013/0217378 A1 | 8/2013 | Danford et al. |
| 2013/0298185 A1 | 11/2013 | Koneru et al. |
| 2013/0305058 A1 | 11/2013 | Kapoor et al. |
| 2014/0108793 A1 | 4/2014 | Barton et al. |
| 2014/0115709 A1 | 4/2014 | Gross et al. |

FOREIGN PATENT DOCUMENTS

| | | |
|---|---|---|
| EP | 1986365 A1 | 10/2008 |
| EP | 2224632 A1 | 1/2010 |
| GB | 2408179 | 5/2005 |
| WO | 0059225 | 10/2000 |
| WO | 2005045550 A2 | 5/2005 |
| WO | 2009014975 | 1/2009 |
| WO | 2009045011 A1 | 4/2009 |

OTHER PUBLICATIONS

Shabrai, et al., Google Android: A Comprehensive Security Assessment, Mar./Apr. 2010, IEEE Computer and Reliability Societies, IEEE Security & Privacy, pp. 35-44.

International Searching Authority, International Search Report, Application No. PCT/CA2011/001058, dated Dec. 11, 2011.

International Preliminary Searching Authority, International Preliminary Report on Patentability, Application No. PCT/CA2011/001058, dated Jan. 7, 2013.

(56) References Cited

OTHER PUBLICATIONS

Canadian Intellectual Property Office, Office Action, Application No. 2783453, dated May 7, 2014.
Canadian Intellectual Property Office, Office Action, Application No. 2783453, dated Jul. 9, 2015.
Canadian Intellectual Property Office, Office Action, Application No. 2814852, dated Dec. 9, 2014.
Machine English translation of Chinese Application No. 101523878 obtained from: https://worldwide.espacenet.com on May 2, 2016.
EP Application No. 12155659.1, Extended European Search Report dated Jan. 8, 2012.
Smartphone Security Beyond Lock and Wipe (Jun. 10, 2010): http://www.enterprisemobiletoday.com/article.php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
Extended European Search Report dated Jul. 13, 2012, in corresponding European patent application No. 12153439.0.
"Customizing User Interaction in Smart Phones", Pervasive Computing, IEEE CS (2006) pp. 81-90 (URL: http://www.idi.ntnu.no/grupper/su/bibliography/pdf/2006/Korpipaa2006pc.pdf).
"Supporting Mobile Privacy and Security through Sensor-Based Context Detection", Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu2010-seifert.pdf).
EagleVision: A Pervasive Mobile Device Protection System, Ka Yang, Nalin Subramanian, Daji Qiao, and Wensheng Zhang, Iowa State University (URL: http://www.cs.iastate.edu/~wzhang/papers/eagleVision.pdf).
"Using context-profiling to aid access control decisions in mobile devices", Gupta et al., Nokia Research Center (URL: http://www.cerias.purdue.edu/assets/symposium/2011-posters/372-C48.pdf) Please refer to the 1-page file named 372-C48.pdf.
U.S. Appl. No. 10/524,353, Office Action dated Sep. 21, 2012.
International Application No. PCT/CA 03/01245, International Search Report dated Dec. 23, 2003.
International Application No. PCT/CA 03/01245, PCT Written Opinion, dated Apr. 23, 2004.
International Application No. PCT/CA 03/01245, PCT Written Opinion dated Sep. 20, 2004.
International Application No. PCT/CA 03/01245, PCT International Preliminary Examination Report, dated Nov. 29, 2004.
3GPP2 C.S0024-A Version 3.0 "cdma2000 High Rate Packet Data Air Interface Specification", 3GPP2. Date: Sep. 2006. <http://www.3gpp2.org/Public_html/specs/C.S0024-A_v3.0_060912.pdf>.
3GPP 25.331 CR3214, 3GPP TSG-RAN-WG2 Meeting# 60, Jeju, Korea, Nov. 5-7, 2007.
"LTE, the UMTS long term evolution: from theory to practice" by Stetania Sesia, Matthew P.J. Baker, Issam Toufik, Wiley, 2009, p. 101 <http://books.google.ca/books?id=E2ppetS3D7cC&pg=PA235&lpg=PA235&lpg=PA235&dq=LTE+HARQ+adaptive+MCS&source=bl&ots=7wmdVldjQi&sig=nBekHRBTcwWfpqk_mJznbLVw7nY&hl=en&ei=r2tDTKCvKJDUtQP5-5C9DA&sa=X&oi=book_result&ct=result&resnum=4&ved=0CB8Q6AEwAw#v=onepage&q=LTE%20HARQ%20adaptive%.
3GPP 25.331 CR3213, 3GPP TSG-RAN-WG2 Meeting# 60, Jeju, Korea, Nov. 5-9, 2007.
3GPP 25.331 CR2600, 3GPP TSG-RAN-WG2 Meeting# 47, Athens, Greece, May 9-13, 2005.
U.S. Appl. No. 13/204,753, Non-Final Office Action dated Apr. 1, 2013.
U.S. Appl. No. 13/204,753, Final Office Action dated Aug. 16, 2013.
U.S. Appl. No. 13/204,753, Advisory Office Action dated Sep. 27, 2013.
U.S. Appl. No. 13/204,753, Non-Final Office Action dated May 15, 2014.
U.S. Appl. No. 13/204,753, Final Office Action dated Sep. 8, 2014.
U.S. Appl. No. 13/204,753, Advisory Office Action dated Dec. 2, 2014.
U.S. Appl. No. 13/204,753, Non-Final Office Action dated Mar. 12, 2015.
U.S. Appl. No. 13/204,753, Final Office Action dated Jul. 9, 2015.
U.S. Appl. No. 13/204,753, Advisory Office Action dated Sep. 22, 2015.
U.S. Appl. No. 13/204,753, Notice of Panel dated Nov. 25, 2015.
Extended European Search Report dated Oct. 21, 2011, in corresponding European Patent Application No. 11176838.8.
Canadian Intellectual Property Office, Office Action on Application No. 2,783,453, dated Jun. 23, 2016.
Canadian Intellectual Property Office, Office Action for application No. 2,783,453, dated Dec. 12, 2017.

* cited by examiner

SYSTEM AND METHOD TO INCREASE LINK ADAPTATION PERFORMANCE WITH MULTI-LEVEL FEEDBACK

FIELD OF THE DISCLOSURE

The present disclosure relates to hybrid automatic repeat request retransmission and in particular relates to adaptive modulation and coding schemes for hybrid automatic repeat request retransmission.

BACKGROUND

Automatic Repeat reQuest (ARQ) is a method for packet data transmission that uses positive or negative acknowledgement by the receiving party to indicate to the sending party whether the data packet has been successfully received or not. If the sender does not receive an acknowledgment or receives negative acknowledgment, it usually retransmits until an acknowledgment is received from the receiving party or the number of re-transmissions exceeds a predefined threshold. The term "Hybrid ARQ" (HARQ) is used to describe any scheme that combines forward error correction (FEC) with ARQ in which data received in unsuccessful attempts are used by receiving party in FEC decoding instead of being discarded. The simplest form of HARQ is called Chase Combining (CC) wherein each retransmission repeats the first transmission, or part of it, and the receiver combines multiple received copies of the coded packet prior to decoding. Incremental redundancy (IR) is another HARQ technique wherein instead of sending simple repeats of the entire coded packet, additional redundant information is incrementally transmitted if the decoding fails on the first attempt. HARQ is used in a number of wireless technologies such as 3GPP High Speed Packet Access (HSPA) and Long Term Evolution (LTE), 3GPP2 High Rate Packet Data (HRPD).

Successful reception may depend on the modulation and coding scheme (MCS) used to send the data packet. A lower order modulation scheme, meaning less number of bits transmitted per modulated symbol, typically provides better performance than higher order modulation in a given radio channel condition, but yields lower data throughput. For example, QPSK (quadrature phase shift keying) is more robust and can tolerate higher levels of communication errors than 16QAM (quadrature amplitude modulation). However, 16QAM provides a higher data rate than QPSK.

Link adaptation is a term used in wireless communications to indicate dynamic matching of the modulation and coding scheme to the radio channel conditions. For example, in case of 3GPP high speed downlink packet access (HSDPA), rate control is implemented by the medium access control high speed (MAC-hs) entity that configures the transport format of a high speed downlink shared channel (HSDSCH) in every 2 milliseconds of transmit time interval (TTI). This results in fast adaptation of both the modulation scheme and instantaneous code rate to provide a data rate suitable for current radio conditions.

Rate control is not applicable during retransmission attempts. This means that that the transport block size and the modulation scheme as well as the number of channelization codes cannot change during retransmission. Thus, in degrading channel conditions, the retransmission of a data packet that was unsuccessfully received uses the same modulation scheme and instantaneous code rate as the first transmission. In such scenario, the data packet is never successfully received, and retransmission will continue until a maximum retry count has been reached on the physical layer and eventually the data retransmission has to be performed on the higher layers such as the radio link control (RLC) level.

BRIEF DESCRIPTION OF THE DRAWINGS

The present disclosure will be better understood with reference to the drawings, in which.

DETAILED DESCRIPTION OF THE DRAWINGS

Figure 1:
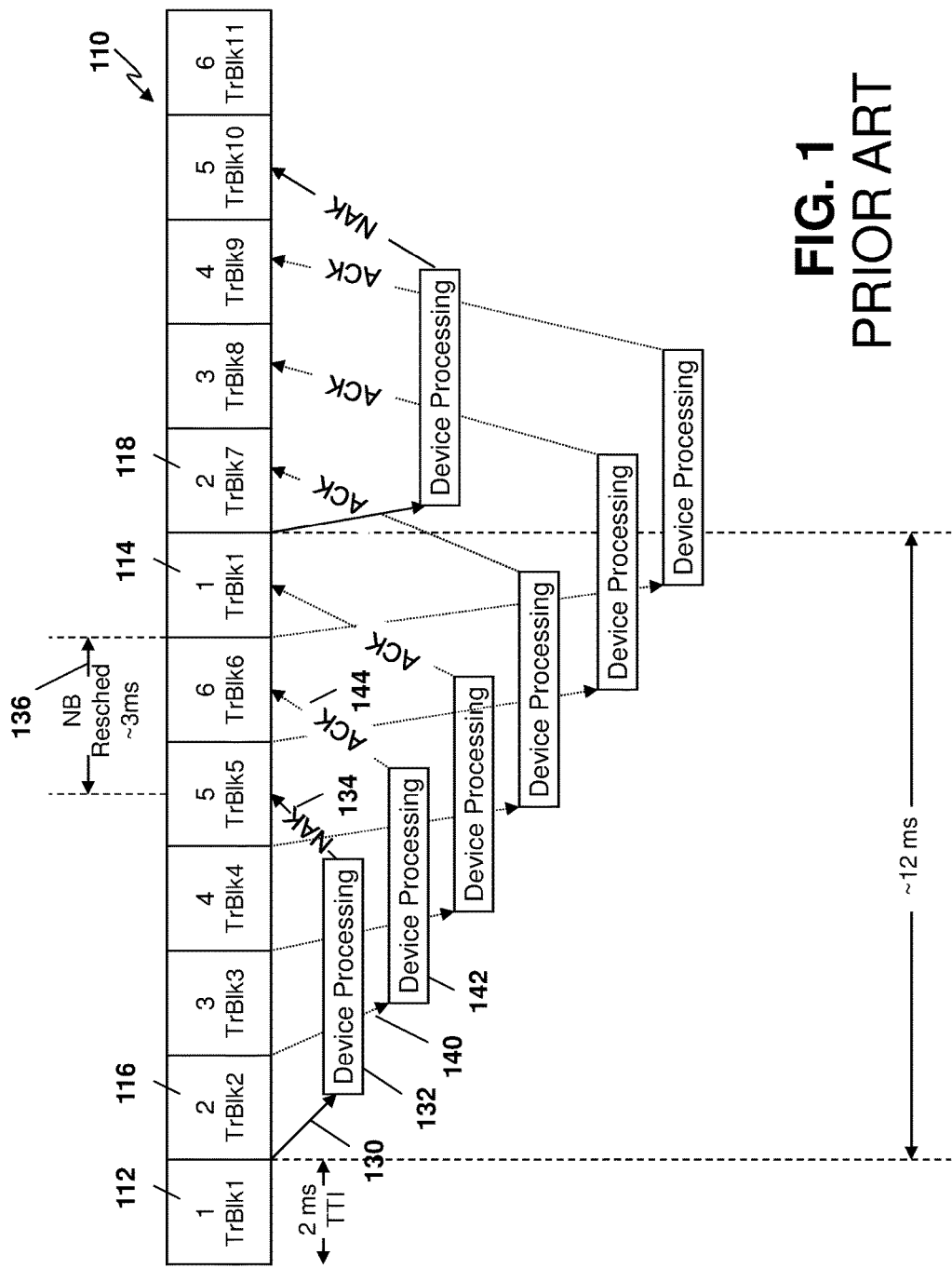
FIG. 1 is a block diagram illustrating transport block processing at a mobile device in a sample HSDPA operation.

The present disclosure provides a method of explicit adaptive modulation and coding scheme selection comprising: receiving, at a mobile device, a transport block targeted to the mobile device; if a quality of the received transport block exceeds a threshold, providing an acknowledgment or negative acknowledgment to a network element; and if the quality of the received transport block is below the threshold, suppressing the acknowledgment or negative acknowledgement.

The present disclosure further provides a mobile device comprising: a processor; a communications subsystem; and memory, wherein the processor, communications subsystem and memory cooperate to: receive a transport block targeted to the mobile device; if a quality of the received transport block exceeds a threshold, providing an acknowledgment or negative acknowledgment to a network element; and if the quality of the received transport block is below the threshold, suppressing the acknowledgment or negative acknowledgement.

The transport block size, modulation scheme as well as a number of channelization codes are typically kept the same during HARQ retransmission of data packets. If channel conditions remain bad during such retransmission attempts, the mobile device will not be able to decode the transmitted packet successfully. As will be appreciated, this may happen frequently in practice, especially when the serving cell providing high speed downlink shared channel (HSDSCH) cell to the mobile device changes.

In a typical HSPA network configuration, 5 HARQ processes are configured for the HSDSCH with a packet retransmission time of 10 ms and a maximum retransmission count configured in Node-B as 5 to 6. These configuration parameters translate to an additional latency of 50 to 60 ms due to retransmission using the same modulation which is expected to fail in deteriorating channel conditions. The high latency increases the round trip time almost twice the expected value provided that the next round of transmission is successful. A typical round trip time in HSDPA systems is about 70 ms and with the above scenario the round trip time increases to around 130 ms, which negatively affects data throughput due to the acknowledged transmission nature of data calls.

Increased latency that occurs as an artifact of retransmission using the same modulation scheme may have a serious adverse impact on certain applications that use packet data services. For example, increased latency may make the circuit switched (CS) voice over HSPA channels (as described in the Third Generation Partnership Project (3GPP) *Technical Specification* 25.331, *"Radio Resource Control; Protocol specification" Change Request* 3214, the contents of which are incorporated herein by reference) not viable as voice service requires certain acceptable delay requirements.

Example of another feature that may suffer degradation as result of increased latency is operation of signaling radio bearer (SRB) when mapped to HSPA channels, as described in 3GPP, *Technical Specification* 25.331, *"Radio Resource Control; Protocol specification" Change Request* 2600, the contents of which are incorporated herein by reference. SRB is used for exchanging control messages and timely reception of the control messages is very important—e.g. increase latency may delay allocation of the radio resources.

Similar problems exist in the Long Term Evolution (LTE) non-adaptive retransmission. The present disclosure is not meant to be limited to HSDPA or LTE but these are merely used as examples below to provide examples of methods that are provided to force a non-adaptive modulation scheme to become an adaptive modulation scheme during HARQ retransmission.

Reference is now made to FIG. 1, which shows a plurality of HARQ process blocks 110 in a HSDPA operation at a mobile device. In the example of FIG. 1, six HARQ processes exist, and are labeled within blocks 110 as "1", "2", . . . "6". As will be appreciated by those in the art having regard to the above, after HARQ process 6 is used, HARQ process 1 is then utilized.

The labels in blocks 110 further show the transport block that is being sent from Node-B (NB) during the HARQ process block.

As seen in FIG. 1, a first HARQ process block 112 is used to send a first transport block on the downlink from the network to a mobile device. This is shown by arrow 130.

A device receives the first transport block and processes the block, as shown by reference 132.

In the example of FIG. 1, the device was unable to successfully receive and demodulate the first transport block and therefore sends a NAK on the uplink back to the network, as shown by arrow 134. The network then requires rescheduling, as shown by arrow 136.

Subsequently, during the next HARQ process 1 block 114, the first transport block is re-sent. Transport blocks 112 and 114 carry the same information content and use the same modulation scheme as well as block size.

Conversely, in the second HARQ process, as shown as block 116, the second transport block is transmitted to a mobile device, as shown by arrow 140. The device then processes the second transport block as shown by block 142 and is able to successfully receive and demodulate the second transport block. Thus, an acknowledgement, shown at arrow 144 is sent back to the network. At the next HARQ process 2 block, shown by reference 118, a new transport block is sent to the mobile device.

Similarly, for the remaining HARQ processes, transport blocks are sent and acknowledged, resulting in new transport blocks being provided in the next HARQ process time slot.

From FIG. 1, the transmit time interval is approximately 2 ms. Thus, with 6 HARQ processes, the retransmission time is approximately 12 ms.

One exemplary situation could be the attempt to send a large packet to a mobile device utilizing 16QAM modulation and a high code rate. This may be TrBlk1 from block 112 in FIG. 1. The sending, in the present example, is being done as wireless channel conditions degrade.

The sending of the large packet results in a NAK being provided to the network, shown by arrow 134. The network then needs to reschedule the next HARQ transmission block to re-send the large packet again. Since the HARQ process is continuing, the next retransmission will utilize 16QAM modulation and the high code rate, even though a lower data rate with QPSK modulation would have been better for retransmission due to the degraded channel conditions.

Such circumstances often require multiple retransmission attempts. For example, typically six attempts are observed in commercial HSPA networks. This results in lower throughput as well as unacceptable delay performance for certain applications such as CS over HSPA or SRBs mapped on HSPA.

In existing HSPA networks, the use of a higher order modulation and coding scheme may be common when the serving HSDSCH cell changes and the new serving HSDSCH cell may not know the channel quality of the mobile device or the mobile device is in an active set with non-serving pilots, among other situations.

Table 1 below shows an example mobile device log on an exemplary commercial HSPA network.

TABLE 1

Sample log

| Row # | Time (s) | sub-frame | CRC | Transport block size | HAP | Modulation type | Number of Codes |
|---|---|---|---|---|---|---|---|
| 1 | 25.880 | 2 | FAIL | 4115 | 1 | 16QAM | 5 |
| 2 | 25.880 | 3 | | N/A | | | |
| 3 | 25.880 | 4 | | N/A | | | |
| 4 | 25.890 | 0 | | N/A | | | |
| 5 | 25.890 | 1 | | N/A | | | |
| 6 | 25.890 | 2 | PASS | 3090 | 0 | QPSK | 5 |
| 7 | 25.890 | 3 | FAIL | 4115 | 1 | 16QAM | 5 |
| 8 | 25.890 | 4 | FAIL | 3762 | 2 | 16QAM | 5 |
| 9 | 25.900 | 0 | FAIL | 1380 | 3 | QPSK | 4 |
| 10 | 25.900 | 1 | | N/A | | | |
| 11 | 25.900 | 2 | | N/A | | | |
| 12 | 25.900 | 3 | | N/A | | | |
| 13 | 25.900 | 4 | FAIL | 4115 | 1 | 16QAM | 5 |
| 14 | 25.910 | 0 | FAIL | 3762 | 2 | 16QAM | 5 |
| 15 | 25.910 | 1 | | N/A | | | |
| 16 | 25.910 | 2 | | N/A | | | |
| 17 | 25.910 | 3 | | N/A | | | |
| 18 | 25.910 | 4 | | N/A | | | |
| 19 | 25.920 | 0 | FAIL | 4115 | 1 | 16QAM | 5 |
| 20 | 25.920 | 1 | FAIL | 3762 | 2 | 16QAM | 5 |
| 21 | 25.920 | 2 | PASS | 1380 | 3 | QPSK | 4 |
| 22 | 25.920 | 3 | | N/A | | | |
| 23 | 25.920 | 4 | | N/A | | | |
| 24 | 25.930 | 0 | | N/A | | | |
| 25 | 25.930 | 1 | FAIL | 4115 | 1 | 16QAM | 5 |
| 26 | 25.930 | 2 | FAIL | 3762 | 2 | 16QAM | 5 |
| 27 | 25.930 | 3 | | N/A | | | |
| 28 | 25.930 | 4 | | N/A | | | |
| 29 | 25.940 | 0 | | N/A | | | |
| 30 | 25.940 | 1 | | N/A | | | |
| 31 | 25.940 | 2 | FAIL | 4115 | 1 | 16QAM | 5 |
| 32 | 25.940 | 3 | FAIL | 3762 | 2 | 16QAM | 5 |

As is seen in Table 1 above, the block sent in row 1 is not properly decoded by a mobile device, even after 60 ms, as shown in row 31. This results in upper layers such as the radio link control (RLC) requiring retransmission.

From Table 1, it can be seen that packets that are transmitted with QPSK modulation have a higher chance of proper decoding due to its robustness to channel imperfections, as seen in rows 6 and 21 of the table.

In particular, Table 1 shows 5 HARQ processes, with each sub-frame being shown in column 3 of the table. The modulation scheme is shown in the second last column and the number of codes allocated to the mobile device is shown in the last column.

The hybrid ARQ process (HAP) for each transmission is shown in the $8^{th}$ column.

Thus, for row 1, at time 25.880, a transport block of 4115 bits is sent on sub-frame 2 using HARQ process 1. The modulation scheme is 16QAM with 5 codes allocated to the mobile device.

Moving down the table to row 7, the same HARQ process is shown again. The 4115 bits are transported utilizing 16QAM with 5 codes allocated to the mobile device and this again fails. The same HARQ process is then shown in rows 13, 19, 25 and 31 and continues to fail.

Conversely, in row 6, 3090 bits are transported utilizing QPSK modulation with 5 codes allocated to the mobile device. In this case, the bits are successfully received and decoded and therefore this process passes.

As will be appreciated, the resending of the HARQ process 1 over 60 ms makes CS voice over HSPA or SRBs mapped on HSPA not viable. For a typically conversational class application such as voice, the packet delay should be strictly maintained under reasonable time limits. The maximum mount-to-ear delay is in the order of 250 ms. Assuming that the delay for the radio network controller plus core network is approximately 100 ms, the total delay for HARQ processes on the physical and MAC layers should be strictly below 150 ms. Hence, assuming that both end users are HSDPA users, the tolerable one way delay for HARQ should be under 75 ms. The addition of 50 to 60 ms delay on top of regular performance would exceed the delay budget designed for voice over Internet protocol (VoIP) or CS voice over HSPA and cause a sub-optimal user experience.

Figure 2:
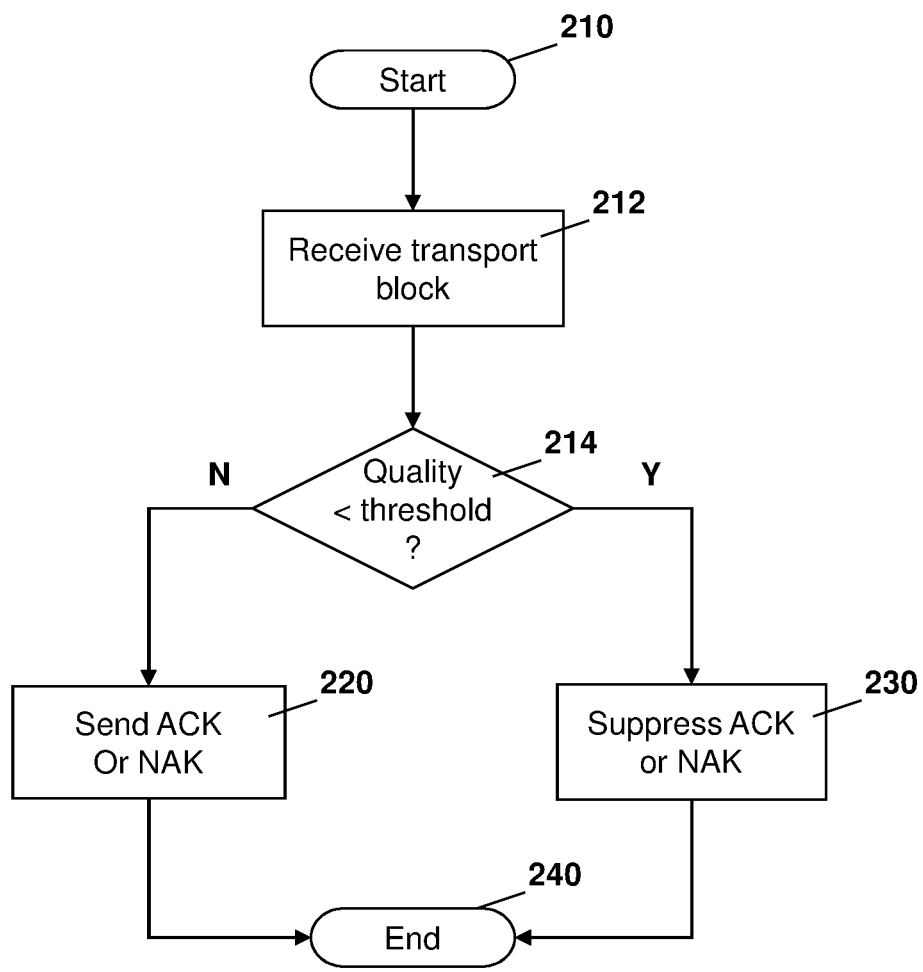
FIG. 2 is a process diagram illustrating a method in accordance with the present disclosure.

Reference is now made to FIG. 2, which shows an exemplary method in accordance with the present disclosure.

The process of FIG. 2 starts at block 210 and proceeds to block 212 in which a mobile device receives a transport block. The transport block is received and associated with a specific HARQ process.

The process then proceeds from block 212 to block 214 in which the quality of the transmission is checked against a threshold.

The check in block 214 can use any thresholds to evaluate the level of reliability of decodability of the received transport block. In one embodiment, this may be achieved by setting a Yamamoto bit to remember if, at any stage in a Viterbi trellis, the distance between the survivor path and the discarded path is smaller than a Yamamoto threshold. In one embodiment, this method is similar to the decision making process of reception of the high speed shared control channel (HS-SCCH) at the mobile device to determine whether the transmission is intended for the mobile device.

In other embodiments the threshold may be determined based on signal quality or other determining factors, and the present disclosure is not meant to be limited to any specific determination in block 214.

From block 214, if the channel quality is greater than a threshold, the process proceeds to block 220 in which an ACK or a NAK is sent based on the received transport block. The ACK would be sent if the transport block was received correctly and properly decoded. The NAK would be sent if the transport block could not be properly decoded but the quality was greater than a threshold.

From block 220 the process proceeds to block 240 and ends.

Conversely, from block 214, if the quality is less than a threshold the process proceeds to block 230. At block 230 the mobile device suppresses the sending of a response to the received transport block. In other words, since the channel quality is less than a threshold, the mobile device suppresses the sending of an ACK or a NAK at block 230 to the Node B which acts as a Base Station Transceiver in a HSPA network.

From block 230 the process proceeds to block 240 and ends.

The network (Node B) does not receive either an ACK or a NAK in response to block 230 and the initial transmission attempt, and will assume that the mobile device may have missed the initial transmission on the downlink. In other words, the network will assume that either the mobile device could not decode the HS-SCCH on the downlink or the ACK or NAK response on the uplink on the high speed physical dedicated control channel (HS-PDCCH) was lost due to bad channel conditions.

With such assumptions, the node B will stop the current HARQ process, flush the HARQ process buffer and start a fresh HARQ process from scratch with a modulation and transport block size more suitable for current channel conditions.

Thus, based on the suppression of the ACK or NAK at block 230, the network element exits a redundant implicit link adaption stage (where the modulation scheme and the transport block size are kept the same) and instead uses an explicit link adaption where a new transport block is transmitted with a more suitable modulation and coding scheme.

As will be appreciated by those in the art having regard to the above, a benefit of exiting the HARQ process and thus entering explicit link adaption is reduced delay. While relying on implicit link adaption alone may be sufficient from a system throughput point of view, the end user service quality may not be acceptable from a delay perspective. The implementation on the device side to evaluate the level of reliability or decodability of the received transport block as described above with regard to block 214 ensures that the mobile device can determine whether or not the received transport block is good enough.

Since the mobile device is at the receiving end of the downlink transmission, only the mobile device has information on whether the received initial transport block has a very poor quality or the device has almost decoded it. At one end of the spectrum, if the transport block is received with very poor quality or not at all, then the mobile device and network are better off with a fresh HARQ process with a more suitable modulation and coding scheme that match current channel conditions. On the other hand, if the mobile device has almost decoded the packet and just needs a few more parity bits to pass the cyclic redundancy check (CRC), then another HARQ retransmission would suffice. This can be done regardless of whether the HARQ utilizes incremental redundancy or chase combining.

At present, the mobile device responds with a NAK in both the scenarios described earlier. Therefore, the network has no information whether to change the modulation and coding scheme or not. The method shown in FIG. 2, provides a mechanism to the mobile device to inform the network so that the network can make a proper decision to mitigate the above-mentioned problems.

Figure 3:
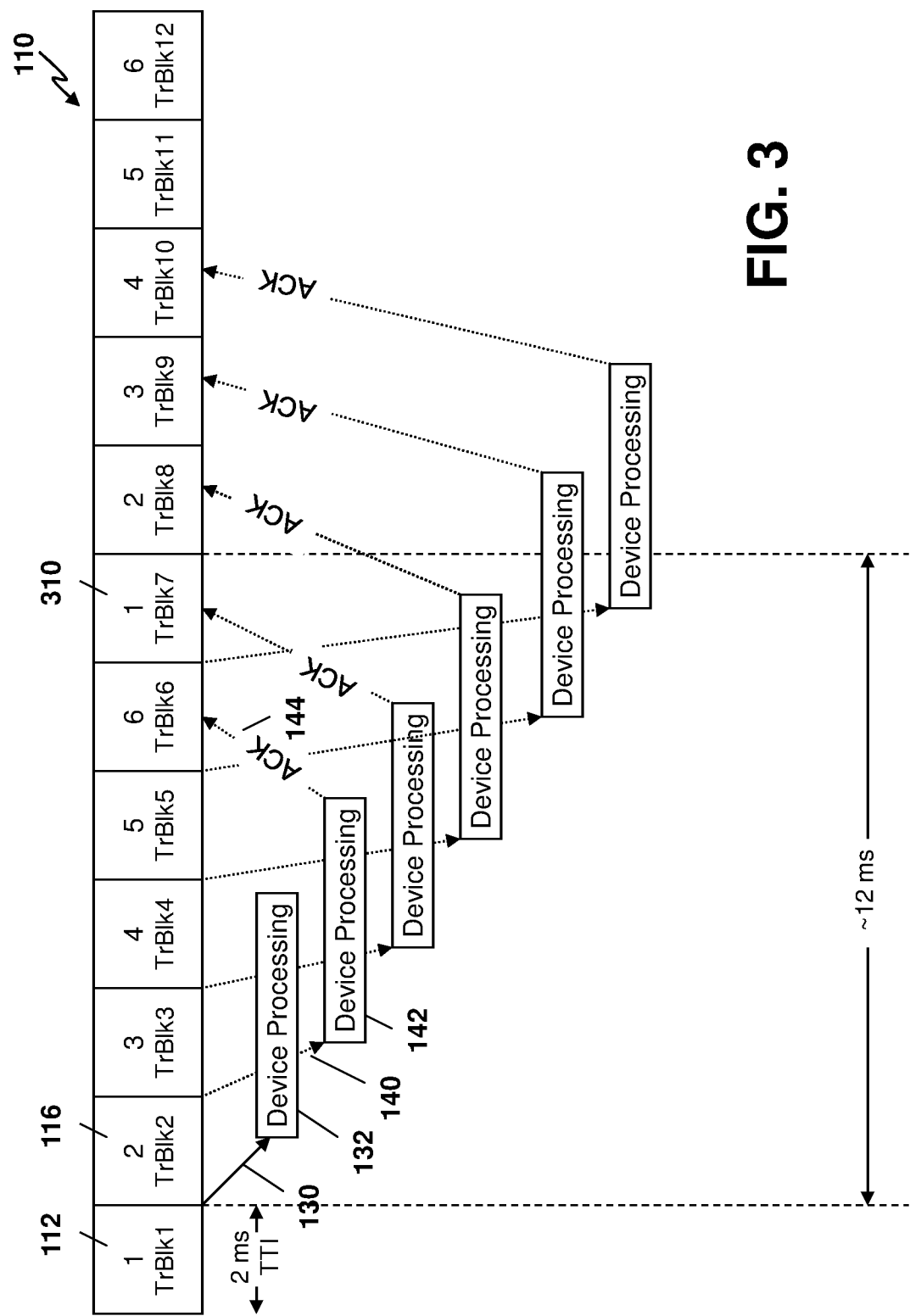
FIG. 3 is a block diagram illustrating transport block processing in a sample HSDPA operation using the process of FIG. 2.

Reference is now made to FIG. 3. FIG. 3 shows the example of FIG. 1 in which block 132 determines, through device processing, that the quality of the received transport block is below a threshold. In this case, the NAK 134 from FIG. 1 is suppressed.

In response, the network receives neither an ACK or a NAK and at the next HARQ process 1, shown by block 310, the example of FIG. 3 shows the transmission of transmit block 7. As will be appreciated, transport block 7 may contain some or all of the data of transport block 1, and is encoded with a modulation and coding scheme more appropriate to meet channel conditions.

The method of FIG. 3 can increase the overall network throughput as it minimizes avoidable unnecessary retransmissions. In networks with packet acknowledgement schemes such as TCP/IP, the maximum effective data throughput is not necessarily equal to the system's peak rate. The latency can reduce the overall throughput to the time required to acknowledge the data packet. In other words, large peak bit rates do not result in better user experience when the latency is too large.

As an example, throughput performance of a typical mobile device is illustrated below. The physical layer peak data rate of HSPA category 10 is 14 mega bits per second (Mbps), which is computed as 27952/2 or 13.9 Mbps assuming transmission of maximum transport block size of 27952 bits transmitted in 2 ms TTI. This peak data rate is calculated with the assumption of all HARQs being fully utilized and no retransmission is triggered. If 6 HARQ processes are configured on the device, then the retransmission behavior can be illustrated in the example of FIG. 1 above.

As can be seen, the mobile device can assist yielding improved throughput by proactively adapting to channel conditions in a timely manner compared to conventional scheme. Reference is now made to Table 2 below.

TABLE 2

Data Throughput of category 10 HSDPA with packet re-transmissions

|                    | Transport block size (bits) | Transmission duration (ms) | Data rate (Mbps) |
|--------------------|----------------------------|----------------------------|------------------|
| No re-tx with 16QAM | 27952 | 2  | 13.976 |
| 1 re-tx with 16QAM  | 27952 | 12 | 2.329  |
| 2 re-tx with 16QAM  | 27952 | 24 | 1.165  |
| 3 re-tx with 16QAM  | 27952 | 36 | 0.776  |
| 4 re-tx with 16QAM  | 27952 | 48 | 0.582  |
| 5 re-tx with 16QAM  | 27952 | 60 | 0.465  |
| 1 re-tx with QPSK   | 14115 | 12 | 1.176  |

As seen from Table 2, utilizing 16QAM modulation coding with a 27952 bit transport block requiring no retransmissions provides a data rate of almost 14 Mbps.

If one retransmission is required with 16QAM and the same transport block size is utilized, then the overall packet transmission duration is 12 ms and throughput decreases to 2.3 Mbps.

If two retransmissions with 16QAM are required with the transport block size of 27952, the overall packet transmission duration is 24 ms and the throughput is 1.165 Mbps.

Similarly, with three retransmissions at the same transport block size the transmission duration is 36 ms and the throughput is 0.77 Mbps. With four retransmissions the transmission duration is 48 ms and the throughput is 0.582 Mbps. With five retransmissions the transmission duration is 60 ms with a data rate of 0.465 Mbps.

Conversely, with one retransmission and the changing of the modulation and coding scheme to QPSK and the transport block size to 14115, the transmission duration is 12 ms and the throughput is 1.176 Mbps.

Thus, as can be seen from Table 2 above, if more than one retransmission is required then it is better to move directly to the modulation and coding scheme that will more likely be successfully received at the mobile device.

Further, as will be appreciated by those skilled in the art having regard to the above, if the initial transmission is received with very poor quality, the probability of the occurrence of increased retransmission attempts is higher if full incremental redundancy (IR) is used as implicit rate adaptation compared to chase combining (CC) for soft decoding. This is due to the fact that during retransmission, not all redundancy versions provide the same amount of information about the transport block. For instance, for turbo codes, the systematic bits are of higher importance that the parity bits. Therefore, the initial transmissions typically have all systematic bits and some parity bits. If full IR is implemented in a network, all the retransmissions will have highly punctured systematic bits and therefore include mostly parity bits. During HSDPA transmission, if mobile device cannot decode the initial transmission it will respond to the network with negative acknowledgement (NAK) on the uplink, triggering the retransmission of the transport block with new redundancy versions.

In a current implementation, if a network uses full IR as the HARQ method and if the mobile device receives a first transmission that it is unable to decode, then triggering a NAK and repeatedly receiving retransmitted parity bits would not help decode the transport block.

If chase combining is implemented on the network side, then retransmissions will include the same coded bits as the initial transmission (systematic bits are prioritized). This may increase the chance of decoding the transmitted transport block.

The above can be implemented on any mobile device and the present disclosure is not meant to be limited to any particular mobile device. One example of a mobile device on which the above could be implemented is shown below with regard to FIG. 4.

Mobile device 400 is a two-way wireless communication device. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 400 is enabled for two-way communication, it can incorporate a communication subsystem 411, including both a receiver 412 and a transmitter 414, as well as associated components such as one or more, antenna elements 416 and 418, local oscillators (LOs) 413, and a processing module such as a digital signal processor (DSP) 420 The particular design of the communication subsystem 411 depends upon the communication network in which the device is intended to operate.

Figure 4:
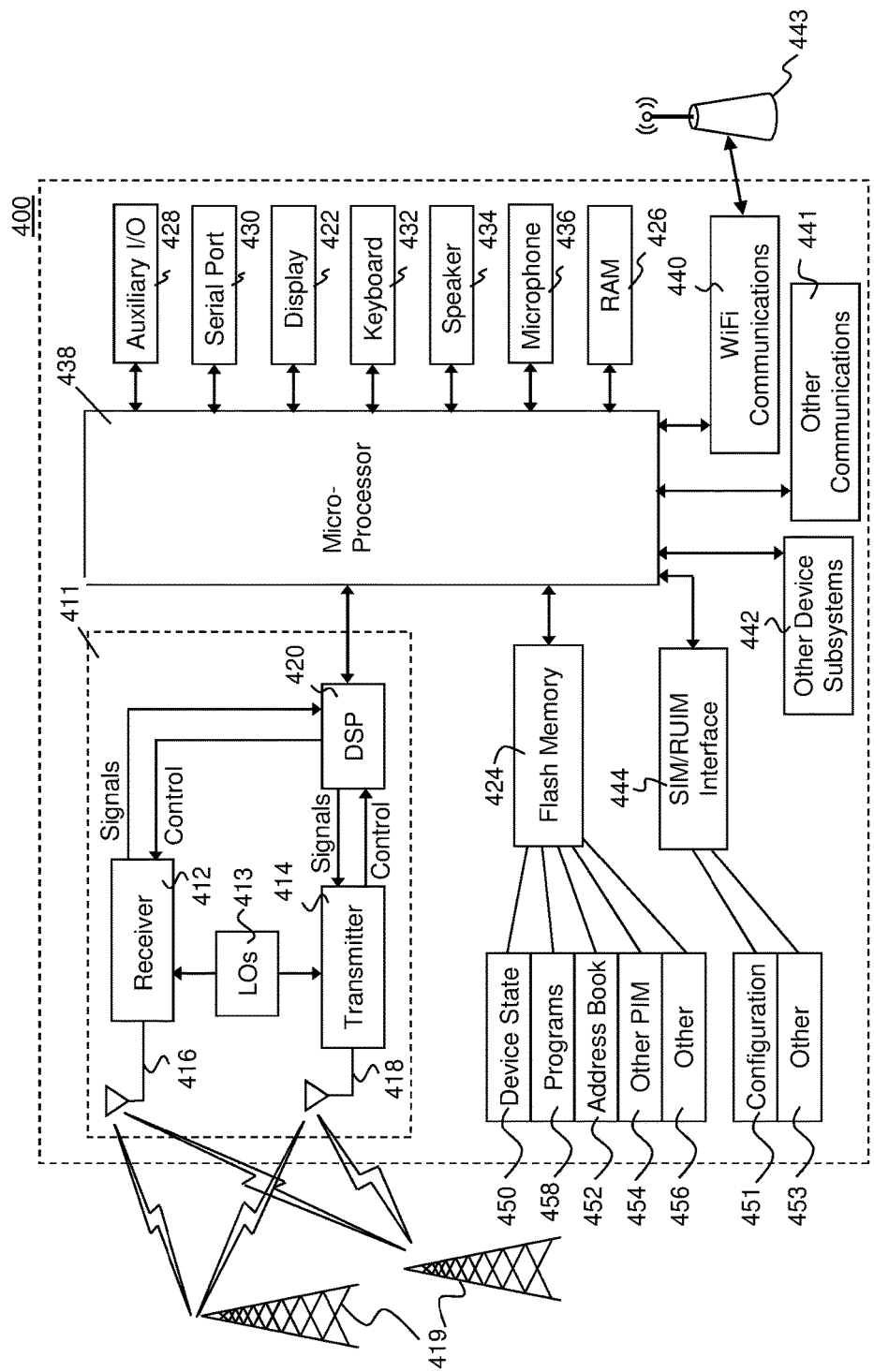
FIG. 4 is a block diagram of an exemplary mobile device capable of being used with the embodiments of the present disclosure.

When required network registration or activation procedures have been completed, mobile device 400 may send and receive communication signals over the network 419. As illustrated in FIG. 4, network 419 can comprise of multiple base stations communicating with the mobile device.

Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Network access requirements will also vary depending upon the type of network 419. In some networks network access is associated with a subscriber or user of mobile device 400. A mobile device may require a removable user identity module (RUIM) or a subscriber identity module (SIM) card in order to operate on a network. The SIM/RUIM interface 444 is normally similar to a card-slot into which a SIM/RUIM card can be inserted and ejected. The SIM/RUIM card hold many key configurations 451, and other information 453 such as identification, and subscriber related information.

Mobile device 400 includes a processor 438 which controls the overall operation of the device. Communication functions, including at least data and voice communications, are performed through communication subsystem 411. Processor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the processor 438 can be stored in a persistent store such as flash memory 424, which may instead be a read-only memory (ROM) or similar storage element (not shown). Specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate each program can allocate a portion of flash memory 424 for their own data storage requirements. Processor 438, in addition to its operating system functions, can enable execution of software applications on the mobile device. A predetermined set of applications which control basic operations, including at least data and voice communication applications for example, will normally be installed on mobile device 400 during manufacturing. Other applications could be installed subsequently or dynamically.

A software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application can have the ability to send and receive data items, via the wireless network 419. In an embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or a non-volatile store (not shown) for execution by the microprocessor 438. Such flexibility in application installation increases the functionality of the device and may provide enhanced on-device functions, communication-related functions, or both.

In a data communication mode, a received signal such as a text message or web page download will be processed by the communication subsystem 411 and input to the microprocessor 438, which further processes the received signal for element attributes for output to the display 422, or alternatively to an auxiliary I/O device 428.

A user of mobile device 400 may also compose data items such as email messages for example, using the keyboard 432, which can be a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile device 400 is similar, except that received signals would be output to a speaker 434 and signals for transmission would be generated by a microphone 436. Alternative voice or audio I/O subsystems, such as a voice message recording subsystem, may also be implemented on mobile device 400. Although voice or audio signal output is accomplished primarily through the speaker 434, display 422 may also be used to provide an indication of the identity of a calling party, the duration of a voice call, or other voice call related information for example.

Serial port 430 in FIG. 4 would normally be implemented in a personal digital assistant (PDA)-type mobile device for which synchronization with a user's desktop computer (not shown) may be desirable, but is an optional device component. Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. Serial port 430 can further be used to connect the mobile device to a computer to act as a modem.

WiFi Communications Subsystem 440 is used for WiFi Communications and can provide for communication with access point 440.

Other communications subsystem(s) 441, such as a short-range communications subsystem, are further components that may provide for communication between mobile device 400 and different systems or devices, which need not necessarily be similar devices. For example, the subsystem(s) 441 may include an infrared device and associated circuits and components or a Bluetooth™ communication module to provide for communication with similarly enabled systems and devices.

The embodiments described herein are examples of structures, systems or methods having elements corresponding to elements of the techniques of the present application. The above written description may enable those skilled in the art to make and use embodiments having alternative elements that likewise correspond to the elements of the techniques of the present application. The intended scope of the techniques of the above application thus includes other structures, systems or methods that do not differ from the techniques of the present application as described herein, and further includes other structures, systems or methods with insubstantial differences from the techniques of the present application as described herein.

The invention claimed is:

1. A method of explicit adaptive modulation and coding scheme selection comprising:
   receiving, at a mobile device, a first transport block containing data for the mobile device encoded with a first coding and modulating scheme;
   evaluating a quality of the received transport block;
   if the quality of the received transport block exceeds a threshold, providing an acknowledgment or negative acknowledgment to a network element; and
   if the quality of the received transport block is below the threshold, suppressing the acknowledgment or negative acknowledgement, wherein the quality is determined to be below the threshold based on a Yamamato bit that provides a binary indication of quality of the transport block;
   in response to the suppressing, receiving, at the mobile device a second transport block containing the data for the mobile device encoded with a second coding and modulating scheme, the second coding and modulating scheme being distinct from the first coding and modulating scheme;
   wherein the second coding and modulating scheme is selected to increase the likelihood of successful reception of the second transport block.

2. The method of claim 1, wherein the transport block is received over a high speed downlink packet access channel.

3. The method of claim 2, wherein the acknowledgement or negative acknowledgement are hybrid automatic repeat request responses.

4. The method of claim 1, wherein the network element is an element within a long term evolution network.

5. The method of claim 1, wherein the threshold is chosen based on a probability of successfully decoding a subsequent transport block utilizing an existing modulation and coding scheme.

6. The method of claim 1, wherein the threshold is set higher if the network element uses chase combining rather than incremental redundancy.

7. A mobile device comprising:
   a processor;
   a communications subsystem; and
   memory,
   wherein the processor, communications subsystem and memory cooperate to:
   receive a first transport block containing data for the mobile device encoded with a first coding and modulating scheme;
   evaluate a quality of the received transport block;
   if the quality of the received transport block exceeds a threshold, providing an acknowledgment or negative acknowledgment to a network element; and
   if the quality of the received transport block is below the threshold, suppressing the acknowledgment or negative acknowledgement, wherein the quality is determined to be below the threshold based on a Yamamato bit that provides a binary indication of quality of the transport block;
   in response to the suppressing, receive a second transport block containing the data for the mobile device encoded with a second coding and modulating scheme, the second coding and modulating scheme being distinct from the first coding and modulating scheme;
   wherein the second coding and modulating scheme is selected to increase the likelihood of successful reception of the second transport block.

8. The mobile device of claim 7, wherein the transport block is received over a high speed downlink packet access channel.

9. The mobile device of claim 8, wherein the acknowledgement or negative acknowledgement are hybrid automatic repeat request responses.

10. The mobile device of claim 7, wherein the mobile device operates in a long term evolution network.

11. The mobile device of claim 7, wherein the threshold is chosen based on a probability of successfully decoding a subsequent message utilizing an existing modulation and coding scheme.

12. The mobile device of claim 7, wherein the threshold is set higher if the network element uses chase combining rather than incremental redundancy.

* * * * *